(No Model.)
J. H. RANDOLPH.
HORSE RAKE.
No. 543,563. Patented July 30, 1895.
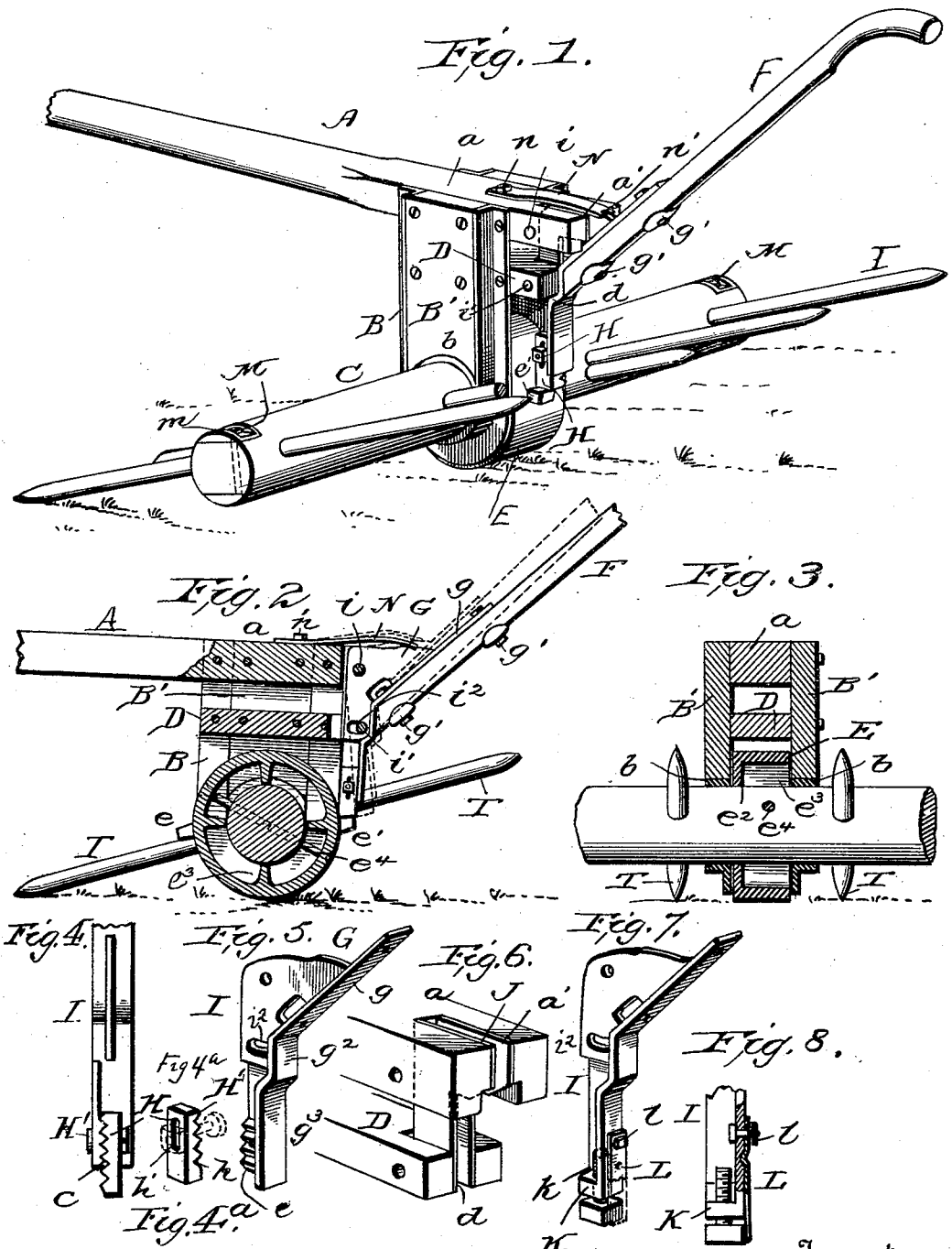
Witnesses
Inventor
John H. Randolph
By Baldwin Davidson & Wight
Attorneys

UNITED STATES PATENT OFFICE.

JOHN H. RANDOLPH, OF BATON ROUGE, LOUISIANA.

HORSE-RAKE.

SPECIFICATION forming part of Letters Patent No. 543,563, dated July 30, 1895.

Application filed April 1, 1895. Serial No. 544,042. (No model.)

*To all whom it may concern:*

Be it known that I, JOHN H. RANDOLPH, a citizen of the United States, residing at Baton Rouge, in the parish of East Baton Rouge and State of Louisiana, have invented certain new and useful Improvements in Horse-Rakes, of which the following is a specification.

My invention relates to that class of horse hay-rakes in which a revolving head is provided with teeth centrally secured, which in operation are tripped and caused automatically to revolve, as desired, so as to bring to the front and into operation the rear teeth, or those ends of the teeth previously projecting to the rear, and free the teeth previously in operation from the gathered load. A rake of this class is shown in my Patent No. 208,267, of September 24, 1878. It is specially designed for use as a horse hay-rake or pea-vine puller. In my aforesaid patent I have shown a rake-head centrally supported in a bracket depending from the tongue. The rake-head is provided with a cam-ring, and a lever pivoted to the tongue is adapted to engage with a stop on said ring, and is held in engagement therewith to hold the rake-teeth in operative position. Certain improvements on the rake shown in my above-mentioned patent constitute the subject-matter of my present invention. The brackets or down-hangers which I now employ, instead of being made of flat parallel plates bolted to the tongue and held apart below the tongue by bolts and sleeves, are now made of angle-irons extending downwardly from the tongue and passing under the rake-head. Each down-hanger or bracket has a filling between the vertical portions of the angle-irons, and this filling is recessed on its under side to conform to the curvature of the rake-head. A block or plate below the tongue and secured to the angle-irons and the fillings is employed to hold apart the lower ends of the brackets.

Instead of forming the central portion of the rake-head integrally with an annular rim or hub, I provide a metallic skeleton hub and bolt it to the rake-head centrally between the down-hangers. In my before-mentioned patent the lever is pivoted in the tongue in advance of the axis of the rake-head and is provided with a rearwardly-extending downwardly-projecting arm adapted to engage with a stop on the hub. I now employ a handle, having at its lower end a lever pivoted in a rearwardly-projecting portion of the tongue beyond the down-hangers, its movement being limited by a bolt secured in a rearwardly-extending portion of the spacing block or plate below the tongue and extending through a slot in the lever. The lever is provided with a foot-piece adapted to engage with the stops of the hub and made adjustable to vary the angle or inclination of the teeth when in operation and also to compensate for wear. By these improvements several important advantages are attained. The implement is stronger and more durable, there is less friction and wear on the moving parts, and a wider range of adjustment is afforded.

In the accompanying drawings, Figure 1 is a perspective view from the rear of a horse hay-rake or pea-vine puller embodying my improvements. Fig. 2 is a view, partly in side elevation and partly in section, of the same. Fig. 3 is a view, partly in rear elevation and partly in vertical transverse section, of the same. Figs. 4, 4$^a$, and 5 are detail views of the stop-lever. Fig. 6 is a perspective view on an enlarged scale of the rear end of the tongue, the rear end of the spacing-plate, and the wearing-plates which are secured therein. Figs. 7 and 8 are detail views of a modified form of stop-lever.

The tongue or pole A has a wide rear end $a$, rectangular in cross-section, to the opposite sides of which are secured down-hangers or brackets B, formed of angle-iron. Each down-hanger or bracket extends downwardly below and around the rake-head C. The two vertical portions of the hanger have between them a filling B', preferably of wood; but it may be made of other suitable material. The filling-piece B' is curved on its under side and may be provided with a metallic lining $b$. The angle-iron B is curved in such manner as to, in connection with the curved under side of the filling B', form a complete circle, constituting a bearing for the rake-head. As shown, both the filling-piece B' and the angle-iron B are secured to the tongue. They are also secured to a plate or spacing-block D, located below the tongue and serving to hold apart the lower ends of the hangers, preventing their lower ends from bending and thus avoiding any undue lateral strain or friction on the hub E, which is secured to the rake-head and is located between the hangers. This hub is made of metal. Its periphery is provided with stops $e$ $e'$ on opposite sides, adapted to engage with the stop-lever hereinafter described. The interior diameter of the hub is somewhat greater than the diameter of the rake-head C; but on one side the hub is provided with a flange $e^2$, the interior diameter of which is approximately the same as that of the rake-head and fits the rake-head closely.

Webs or teeth $e^3$, projecting from the flange and from the rim, are adapted to bear on the periphery of the rake-head, and thus afford a light but strong connection between the rake-head and the rim of the hub. A bolt $e^4$, extending through the hub and centrally through the rake-head, secures the hub and rake-head together. The tongue and also the spacing-block D extend rearwardly beyond the hangers and are slotted at $a'$ and $d$, as more clearly shown in Fig. 6. The handle F is secured at its lower end to a stop-lever G. This lever is provided with a flat upwardly-inclined rearwardly-projecting portion $g$, which is secured by bolts $g'$ to the handle. The flat portion $g$ is continued downwardly and is formed at $g^2$ with a seat for the lower end of the handle. The lower portion $g^3$ of the back piece forms a part of the guide for the adjustable stop H.

A web I, projecting from the back piece, extends into the slots $a'$ and $d$ in the tongue and in the spacing-block D. The web is pivotally connected to the tongue by a bolt $i$, and a bolt $i'$ extending through the spacing-block D and through a slot $i^2$ in the web limits the movement of the lever on its pivot.

Wearing-plates J are secured to the tongue and spacing-block D, on opposite sides of the web I, by the bolts $i$ and $i'$. The lower end of the web I is serrated at $c$ and is adapted to engage with serrations $h$ on a stop-block or foot-piece H. This foot-piece is secured to the web by a bolt H', which extends through a perforation in the web and through a slot $h'$ in the foot-piece. By this means the foot-piece may be adjusted vertically to compensate for wear or to vary the inclination or pitch of the teeth T carried by the rake-head.

It will be observed that the slot $h'$ is located nearer to one end of the foot-piece than to the other, by which arrangement, without unduly weakening the block with the slot, I can obtain a greater range of adjustment by reversing the block when required. The foot-piece is adapted to engage with the stops $e$ and $e'$ located on the hub E. Other devices may be employed for adjusting the foot-piece.

In Figs. 7 and 8 I have shown a foot-piece K, provided with a screw-bolt $k$ extending through a bottom flange on the stop-lever. The foot-piece may be rectangular or provided with flat sides, and it is held in its adjusted position by means of a pivoted spring-plate L secured to the back piece at $l$.

Instead of strengthening the ends of the rake-head by means of collars, as shown in my before-mentioned patent, I extend bolts M through the ends of the rake-head, the heads of the bolts and the nuts being seated in socket-pieces $m$. The stop-lever is held in the position to which it is adjusted by means of a flat spring N secured to the top of the tongue at $n$ and bearing at $n'$ on the top of the web I. The angle-irons are preferably of wrought or malleable iron, and therefore strong and not liable to break. By their peculiar formation bending or spreading is avoided, and therefore I obtain strength with lightness.

I claim as my invention—

1. The combination, substantially as hereinbefore set forth, of the tongue, the down-hangers, the spacing block below the tongue and secured to the down-hangers, the rake head journaled in the down-hangers, the removable skeleton hub secured to the rake head between the down-hangers, stops on the periphery of the hub, the stop lever pivoted to a rearwardly projecting portion of the tongue, beyond the down-hangers, and provided with a slot through which extends a bolt for limiting the movement of the lever, and an adjustable stop or foot piece on the lower end of the stop lever adapted to engage with the stops on the hub.

2. The combination, substantially as hereinbefore set forth, of the tongue, the rake head, the angle irons secured to the tongue and extending under the rake head, the filling pieces between the vertical portions of the angle irons and conforming at their lower ends to the rake head, the hub secured to the rake head between the angle iron hangers, the stop lever pivoted to a rearwardly projecting portion of the tongue, beyond the down-hangers, and an adjustable foot piece on the stop lever adapted to engage with stops on the hub of the rake head.

3. The combination, substantially as hereinbefore set forth, of the tongue, the down-hangers, the rake head journaled in the down-hangers, the stop lever pivotally connected with a rearwardly projecting portion of the tongue, beyond the down-hangers, and the slotted, serrated foot piece provided with a bolt for securing it to the lower portion of the stop lever.

4. The combination of the tongue, the down-hangers, the rake head journaled in the down-hangers, the skeleton hub secured to the rake head between the hangers, the stop lever having a web pivoted to a rearwardly projecting portion of the tongue, beyond the down-hangers, a spring secured to the tongue and bearing on the top of the web, an adjustable foot piece adapted to engage with the stops of the hub of the rake head, and bolts extending through the rake head at its opposite ends and having their heads secured in socket plates, substantially as described.

In testimony whereof I have hereunto subscribed my name.

JOHN H. RANDOLPH.

Witnesses:
CHAS. BERGERON,
FELIX LEVY.